United States Patent [19]
Silvenis et al.

[11] Patent Number: 5,150,841
[45] Date of Patent: Sep. 29, 1992

[54] LIQUID SPRAY DISPENSER

[75] Inventors: Scott A. Silvenis, Midland, Mich.; Paul B. Monaghan, Lexington; Arthur A. Massucco, Natick, both of Mass.; Richard H. Spencer, Winchester; William R. Gagné, Boston, both of Mass.

[73] Assignee: DowBrands Inc., Indianapolis, Ind.

[21] Appl. No.: 707,256

[22] Filed: May 23, 1991

Related U.S. Application Data

[63] Continuation of Ser. No. 7,405,246, Sep. 11, 1989, abandoned.

[51] Int. Cl.⁵ ............................................. B05B 9/04
[52] U.S. Cl. .................................. 239/332; 239/488; 239/375; 222/333; 222/481.5; 137/512.4; 137/859
[58] Field of Search ............... 239/329, 331, 332, 375, 239/474, 487, 488; 222/333, 481, 481.5; 137/512.4, 859

[56] References Cited

U.S. PATENT DOCUMENTS

| | | | |
|---|---|---|---|
| 1,667,943 | 5/1928 | Munz | 239/487 |
| 2,096,042 | 10/1937 | Irwin | 239/333 |
| 2,732,255 | 1/1956 | Adan | 239/375 |
| 2,851,201 | 9/1958 | Poitras et al. | 222/481 |
| 2,981,483 | 4/1961 | Pichon | 239/474 |
| 2,984,421 | 5/1961 | Hession, Jr. | 239/487 |
| 3,079,946 | 3/1963 | Rosler | 137/859 |
| 3,173,584 | 3/1965 | Giavasis | 222/333 |
| 3,288,375 | 11/1966 | Conover | 239/333 |
| 3,901,449 | 8/1975 | Bochmann | 239/332 |
| 3,993,250 | 11/1976 | Shure | 239/332 |
| 4,057,177 | 11/1977 | Laavwe | 222/481.5 |
| 4,154,375 | 5/1979 | Bippus | 239/332 |
| 4,161,288 | 7/1979 | McKinney | 222/380 |
| 4,162,037 | 7/1979 | Koyama | 222/333 |
| 4,187,959 | 2/1980 | Pelton | 222/333 |
| 4,241,756 | 12/1980 | Bennett et al. | 137/859 |
| 4,364,520 | 12/1982 | Weber, Sr. | 239/332 |
| 4,463,905 | 8/1984 | Stoesser et al. | 239/329 |
| 4,485,943 | 12/1984 | Czech | 222/340 |
| 4,570,833 | 2/1986 | Vanderjagt | 222/333 |
| 4,646,945 | 3/1987 | Steiner et al. | 222/481 |
| 4,790,454 | 12/1988 | Clark et al. | 239/332 |
| 4,852,605 | 8/1989 | Goouhier | 137/859 |

Primary Examiner—Andres Kashnikow
Assistant Examiner—Christopher G. Trainor

[57] ABSTRACT

A battery operated hand-held dispenser which operates efficiently at lower power levels than prior art devices. The dispenser as included therein has spray, foam or stream, dispensing capabilities coupled with pump mechanisms, vent mechanisms and positive closures.

3 Claims, 8 Drawing Sheets

LIQUID SPRAY DISPENSER

This application is a continuation of application Ser. No. 07/405,246 filed Sep. 11, 1989 now abandoned.

BACKGROUND OF THE INVENTION

This invention relates generally to the art of dispensing cleaning products and more particularly to a hand held apparatus for spraying a liquid cleaning product onto a surface for the cleaning of the surface.

A variety of hand held pump devices have been developed for the consumer to utilize in order to apply cleaning solution to soiled surfaces. Such cleaning solutions are generally of the all-purpose type or specialized window or bathroom cleaners. Hand held devices have normally been trigger or fingertip operated. An example is illustrated in U.S. Pat. No. 4,072,252. The spray apparatus illustrated therein creates very high pressures upon trigger actuation. Pressure magnitudes are such that a great deal of forgiveness is tolerated with regard to the efficiency and efficacy of the nozzle mechanisms in the production of desirable spray patterns. Of course, a shortcoming of trigger actuated devices is that the operation is intermittent such that a spray pattern only occurs upon each actuation of the trigger. Additionally, such trigger operated devices cause finger fatigue when large surfaces are to be cleaned. This is especially a problem when the user is easily fatigued, aged or otherwise suffers from some debilitation such as arthritis. A large variety of trigger actuated devices are described in prior art patents.

In the art of spraying, per se, separate and apart from the art of hand held dispensers for consumer cleaning products, battery operated industrial sprayers are exemplified by the devices described in U.S. Pat. No. 4,618,099 to Nagao, et al. and U.S. Pat. No. 4,621,770 to Sayen; U.S. Pat. No. 3,904,116 to Jones, et al. and U.S. Pat. No. 3,901,449 to Bochmann.

U.S. Pat. No. 3,696,973 discloses a hand held rechargeable battery operated air compressor which may be in communication with a plastic container of a liquid to be sprayed. Such device is intended to replace aerosols for the spraying of a liquid such as hair spray.

In the novelty device area, there have been battery operated water pistols such as that in U.S. Pat. No. 4,706,848 to D'Andrade. Such novelty devices are not concerned with the spray patterns which must be developed in order to assist the consumer with the use of a cleaning product and concomitantly are not confronted with the pressure limitations in that regard.

Thus, while a variety of devices exist for spraying liquids, significant room for improvement exists to aid the consumer in the spraying of liquid cleaning products.

SUMMARY OF THE INVENTION

It is thus an object of this invention to provide a novel hand held dispenser for liquid cleaning products.

It is a further object of this invention to provide such a dispenser which is battery operated so as to eliminate the need for manual trigger pumping of such liquid.

It is a yet further and more particular object of this invention to provide such a dispenser which is operable at pressures less than those heretofore utilized so as to permit operation at low power levels.

It is a still further and more particular object of this invention to provide a novel nozzle structure to permit liquid spraying at low pressures.

It is a yet further object of this invention to provide a novel nozzle structure to permit foam spraying at low pressures.

It is yet a further object of this invention to provide a novel pumping apparatus with improved efficiency to add yet to the ability to provide a spray pattern utilizing low pressure differentials and low power levels.

These as well as other objects are accomplished by a hand held dispenser having a body portion, an elongated neck portion communicating with the dispensing nozzle. A handle having a hollow therein is generally parallel to the elongated portion and defines a gripping space between the elongated neck and the handle The handle is connected to the nozzle by a transition portion which houses an electric motor and a pump.

DETAILED DESCRIPTION

In accordance with this invention significant problems have been discovered and solved as they relate to the production of desirable spray patterns and foam patterns from a hand held liquid dispenser. These problems are associated with the ability of a consumer to utilize an inexpensive and semi-disposable hand held dispenser for the purpose of dispensing a variety of household cleaning products.

The problems which have been recognized and solved have come about by the development of a hand held dispenser which eliminates the need for manual pumping. The manual pumping is eliminated in accordance with this invention by the use of a low power battery operated sprayer. This description is given with reference to household cleaning products since that is the main focus for the use of the invention. It is, however, understood that the invention may be used with any liquid product for the dispensing thereof.

While prior art trigger operated devices have been operable only at very high instantaneous pressures, significant structural improvements in accordance with this invention permit operation at low pressure differentials and thus at low powers. Such pressure differentials are significantly less than those which are operable with the nozzle and pumping structures of prior art manual triggering devices. Various other advantages and features of this invention will become apparent from a reading of the following description given with reference to the various figures and drawings.

Figure 1:
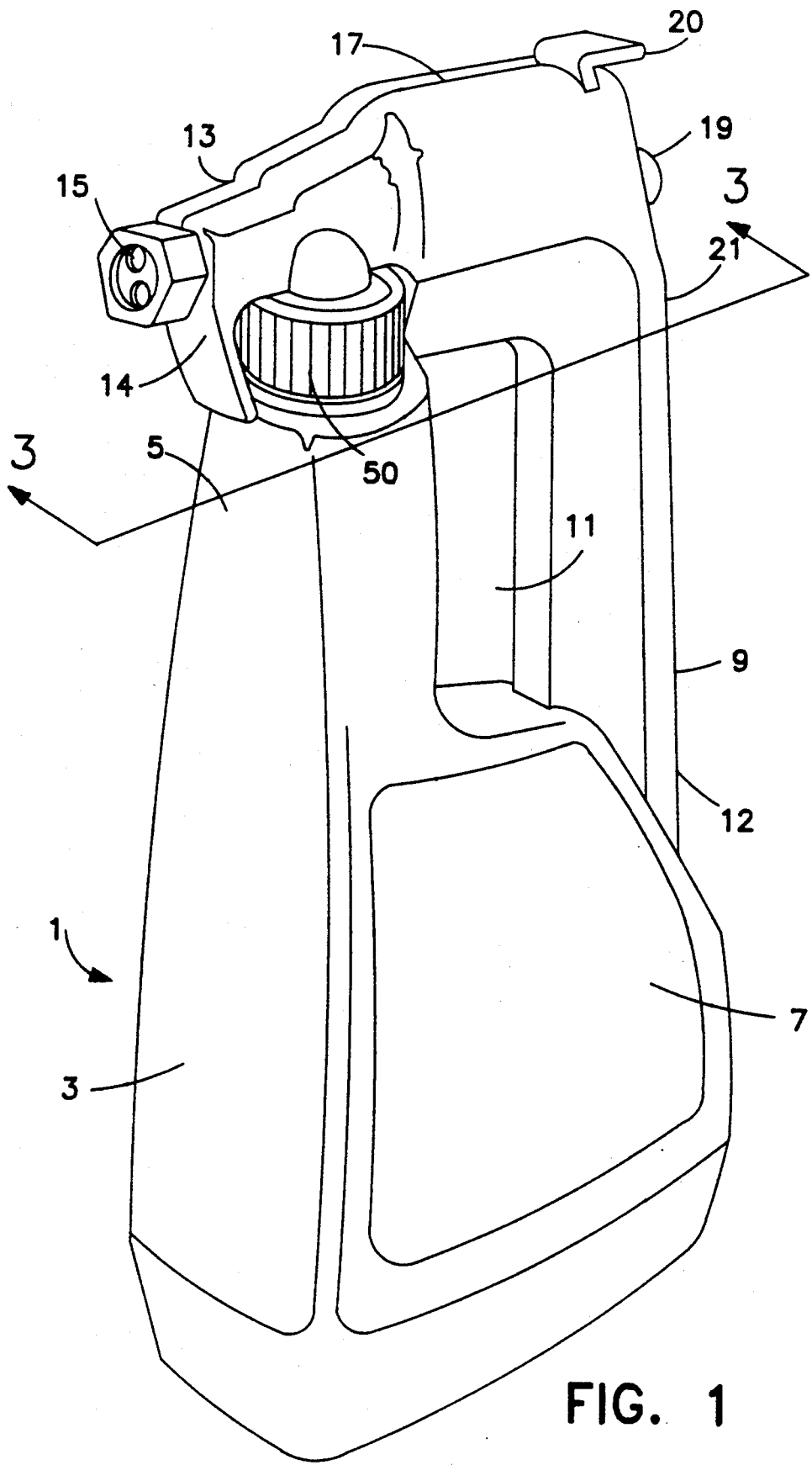
FIG. 1 of the drawings illustrates the hand held dispenser in accordance with this invention in perspective view.

FIG. 1 of the drawings illustrates in perspective view a hand held dispenser 1 in accordance with this invention. The dispenser comprises a bottle 3 having an elongated neck portion 5 and a body portion 7. A handle 9 is spaced from elongated neck portion 5 to define a gripping space 11 therebetween. It is thus intended that handle 9 be gripped with the fingers passing through space 11 for the gripping and maneuvering of the entire dispenser 1.

A nozzle assembly 13 including an outlet 15 defines the point at which a liquid product leaves the dispenser of this invention for application to a desired surface. Nozzle assembly 13 may have a hook structure 14 attached thereto to permit hanging of the dispenser 1 from accessible areas such as rungs of a ladder.

A transition section 17 connects nozzle assembly 13 with handle 9.

A switch 19 to actuate pumping and dispensing is positioned so as to permit thumb actuation when handle 9 is gripped by either hand of the user with fingers passing through gripping space 11. The configuration illustrated permits actuation without joint flexing. As better illustrated in FIGS. 2 and 3, switch 19 may be deactivated by safety 20 so as to preclude operation when such is not desired.

It should be noted that handle 9 preferably has a gentle angle generally illustrated at 21 of FIG. 1 so as to permit ergonomic gripping to conforming to the morphology of the hand thumb structure. Handle 9 may have a backward tilt to balance the dispenser and its contents in the handle and thus the hand of the user. It is thus contemplated that the dispenser of this invention will be useable by individuals not possessing great hand strength. Such individuals may be suffering from an incapacitating illness such as arthritis or may be simply weakened due to other illness or aging. The structure of the apparatus of this invention permits such individuals to perform useful activities that they might not otherwise have been able to perform. Handle 9 terminates at 12, which termination aids in properly locating handle 9 with respect to the body portion 7. Preferably, bottle 1 has a locator thereon with which to align with handle 9.

Figure 2:
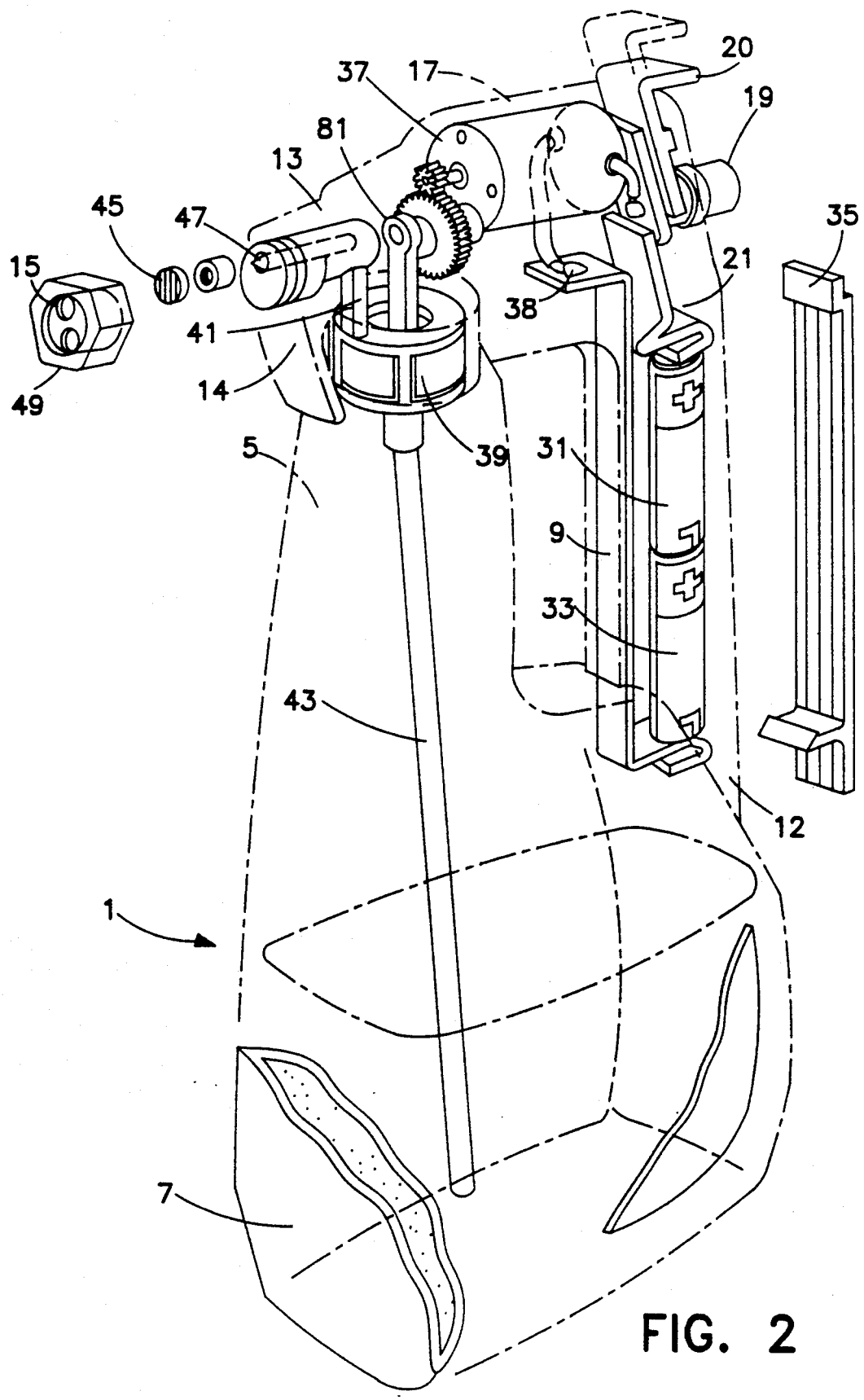
FIG. 2 of the drawings is a view similar to FIG. 1 illustrating the components within the hand held dispenser in partial assembly view.

Referring to FIG. 2 of the drawings, the body portion 7 and neck portion 5 are illustrated in partial phantom so as to view the location and configuration of the components used therein. It should be noted from FIG. 2 that handle 9 and nozzle assembly 13 are in partial assembly view so as to better view and understand the components thereof.

Within handle 9 are housed lightweight and low voltage batteries 31 and 33. It is contemplated that such batteries will be 1½ volt AA batteries of the type that are inexpensive and utilized on a variety of consumer products. However, a rechargeable battery system may be utilized within this structure. Handle 9 provides access to the hollow thereof by removable door section 35. As illustrated in FIG. 2, the batteries are utilized with solder connections such as 38 so as to provide electrical communication to motor 37. Solder connection such as 38 may, however, be eliminated and all electrical connections made by the appropriate fitting of the structure together in such a way that electrical contact is provided in a desired manner. Batteries 31 and 33 provide power through switch 19 to motor 37 which is in communication with pump 39. Pump 39 provides through conduit means 41 a flow of liquid to nozzle assembly 13 and thus out of outlet 15. It is seen that pump 39 is also in communication with the body portion 7 containing a liquid product through submerged tube 43.

Within the nozzle assembly 13 a screen 45 may optionally be positioned between outlet 15 and nozzle 47. Such spray screens are described in U.S. Pat. Nos. 4,463,905 and 4,603,812, both to Stoesser, et al., which are herewith incorporated by reference. As described in these patents, a screen 45 is interposed into the path of the spray from nozzle 47. This may be brought about by rotation of means 49.

As an additional embodiment of this invention, a spray screen such as 45 may be flipped upwardly or downwardly so as to interpose itself into the path of the spray emanating from nozzle 47. This flip up and down type of construction provides a simpler configuration than the use of a rotation.

Nozzle assembly 13, transition section 17 and handle 9 are connected to elongated neck section 5 by cap 50 which may include a gasket and a one-way vent to be further described in the description of a preferred embodiment.

Further description will be given with reference to the functioning of the nozzle 47 and pump 39. Aspects of this configuration are significant to overcoming the problems found to exist when attempting to operate at the power levels permissible in a hand held consumer oriented dispensing apparatus. Prior art spray devices which can develop spiral spray patterns require operation with a pressure differential of approximately 45 pounds per square inch. As a practical matter, it was found that a hand held battery operated device could only develop a pressure differential of approximately 25 pounds per square inch. Additionally, prior to this invention the production of a foam from a swirl spray pattern was considered impossible at pressure differentials below approximately 45 psi.

In accordance with this invention however, utilizing the structures to be described below, it has been found that a spray pattern may be produced at pressure differentials as low as 6 psi and that foam may be produced at a pressure differential within the range of 6 to 20. These unexpected and surprising results are brought about in large measure by the structure of the spray nozzle 47 which is complemented by pump 39.

Figure 3:
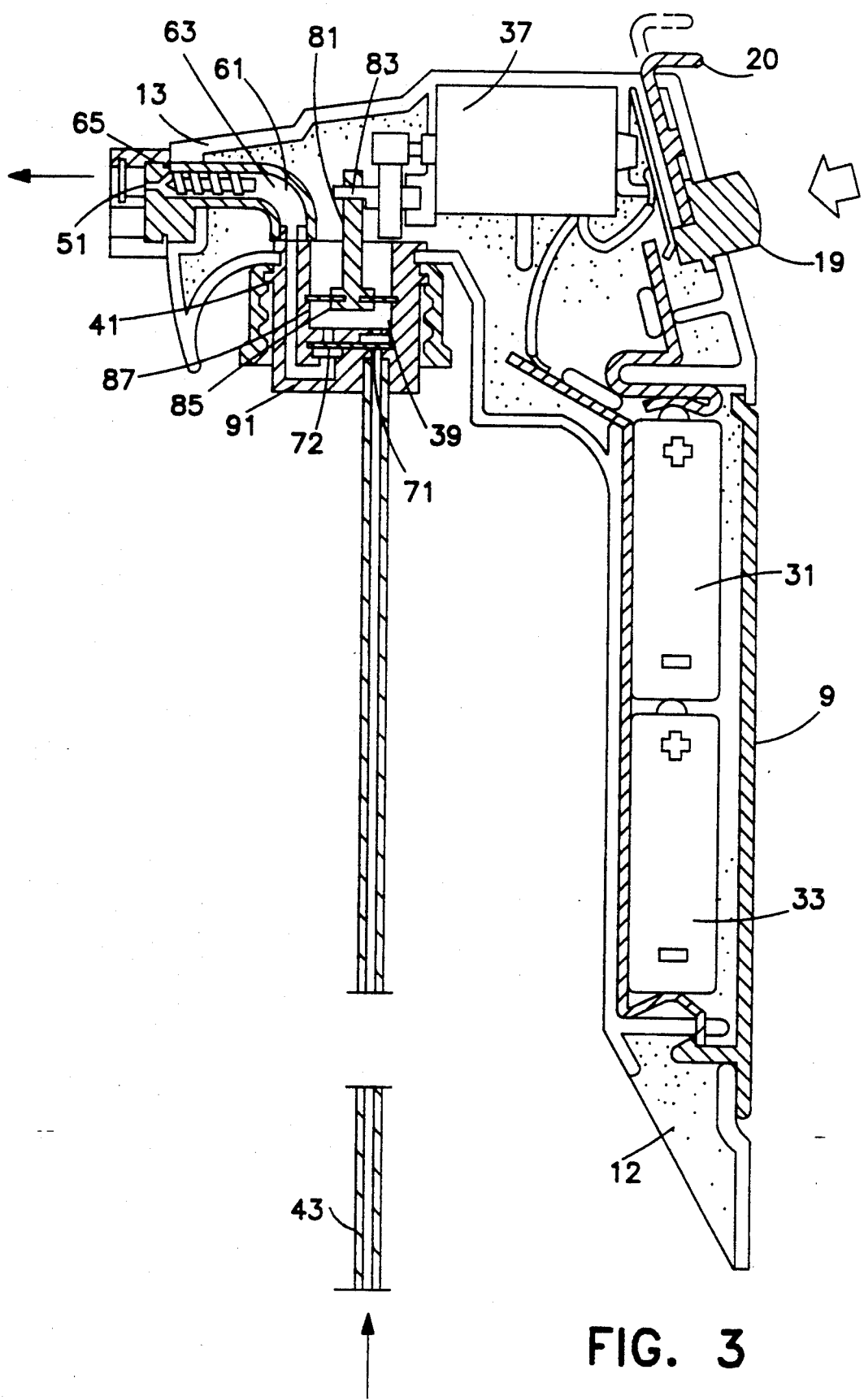
FIG. 3 of the drawings is a cross-section view along the line 3—3 of FIG. 1.

Referring to FIG. 3 of the drawing which is a cross-section along the line 3—3 of FIG. 1, it is seen that conduit means 41 communicates with nozzle assembly 13.

Nozzle assembly 13 includes a spray orifice 51 and a generally cylindrical bore 61 having a hollow 63 therein which converges to form orifice 51. Within the hollow 63 of said bore 61 is a screw-shaped structure 65 which imparts a swirl to the liquid passing from conduit means 41 to orifice 51. Thus the liquid product entering nozzle 47 has spiral motion which enhances the breakup into a spray pattern as it emerges from the nozzle and exits through orifice 51. A spray of fine particles is the desirable pattern for contacting a surface with a cleaning liquid This spray pattern is developed at pressures significantly less then those required for prior art spray devices This result is surprising and unexpected.

Another feature imparting substantial improvements to the operation of the apparatus in accordance with this invention is the pump 39. At the outset, it should be noted that pump 39 operates utilizing two flapper valves 71 and 72, respectively, between tube 43 and pump 39 and conduit means 41. Such flapper valve structures are well known in the art. It is understood, however, that conventional ball check and needle valves may also be used rather than the flapper valve structures as illustrated. Upon viewing the structure of pump 39 as illustrated in FIG. 3, it is seen that pump 39 comprises a rod 81 which reciprocates from eccentric drive 83 due to the rotation of motor 37. Rod 81 is terminated by a piston-like end 85 connected to a flexible diaphragm 87. Below piston-like end 85 and flexible diaphragm 87 is an outlet 91 controlled by flapper value 72 through which the pumped liquid passes Pump 39 is a hybrid between a piston and a diaphragm pump because of the piston-like end 85 in diaphragm like operation thereof brought about by reciprocation of the rod 81. It has been surprisingly found that this structure provides a flow pattern which permits the efficient development of a spray pattern utilizing less power than would be required by either a pure piston pump or a diaphragm type pump. This effect combines with the structure of the spray nozzle of this invention to achieve the development of spray patterns and foaming at greatly reduced pressures.

An additional feature which adds to the positive effects achieved from the combination of the above-described nozzle and pump 39 is the utilization of flexible tubing for the bore 61. Such flexible tubing tends to act as an energy storage device upon each stroke of piston-like end 85. The flexible tubing thus tends to smooth out pulses which occur as a result of the reciprocation of rod 81.

Figure 4:
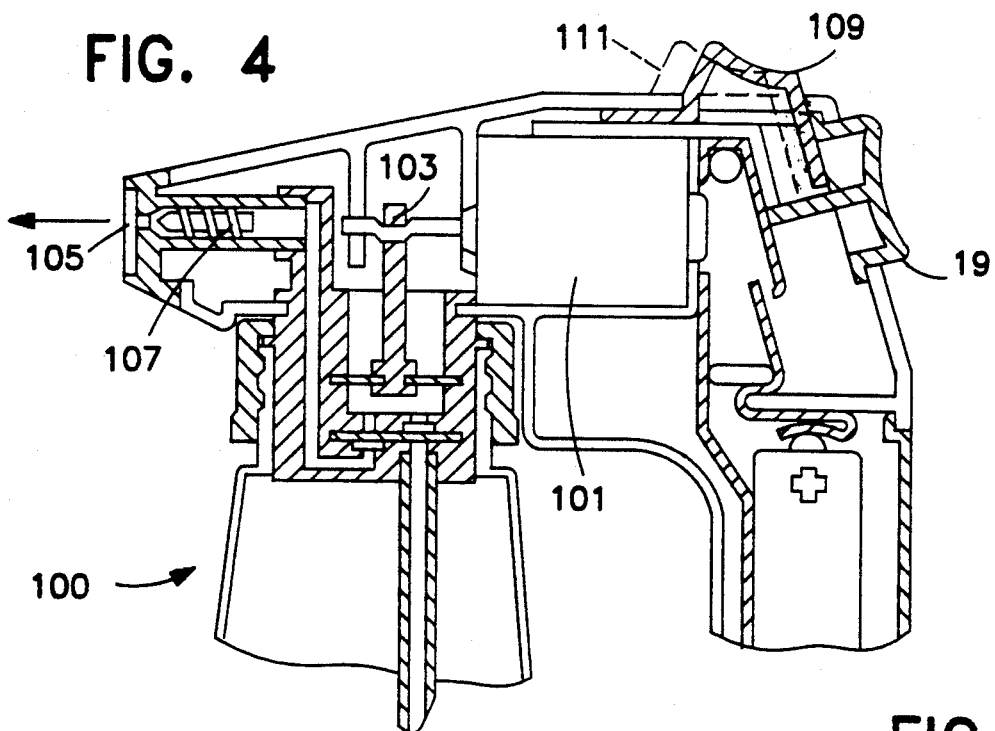
FIG. 4 of the drawings illustrates in cross-section view yet another embodiment of this invention.

FIG. 4 of the drawings illustrates another embodiment of this invention wherein a dispenser 100 has a motor 101 which directly drives a rod 103 without the use of the gearing as illustrated in FIGS. 2 and 3. This embodiment is a spray or stream only feature in that nozzle 105 does not include the foam feature previously described. Additionally, if screw 107 is backed away from nozzle 105 the apparatus then becomes a stream dispenser as opposed to a spray dispenser. It should be noted from the FIG. 4 embodiment that the construction is greatly simplified over the construction illustrated in FIG. 3 in that the gearing mechanisms illustrated in FIG. 3 have been eliminated with pumping initiated through direct attached to the motor 101.

The FIG. 4 embodiment also illustrates a preferred safety mechanism illustrated at 109 and in phantom in the on position at 111.

Figure 5:
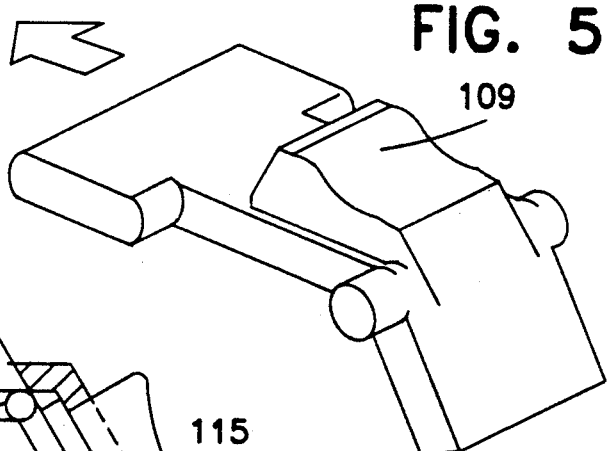
FIG. 5 of the drawings is a perspective view of a safety device in accordance with this invention.
Figure 6:
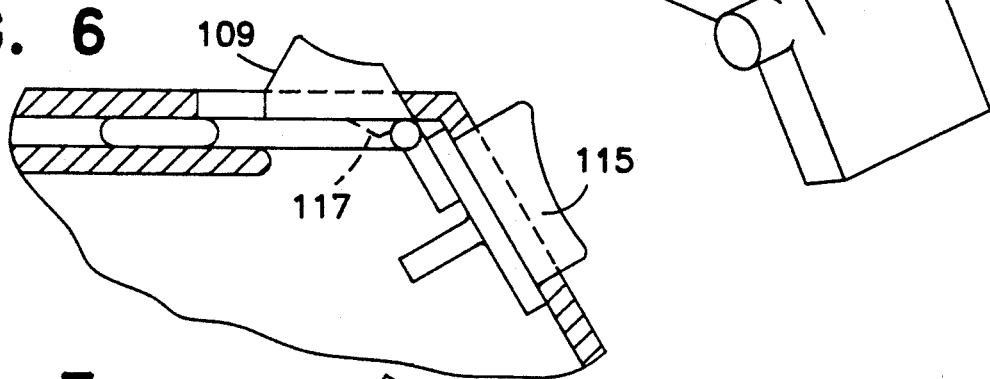
FIGS. 6 and 7 of the drawings illustrate the operation of the safety device in a cross-sectional view.
Figure 7:
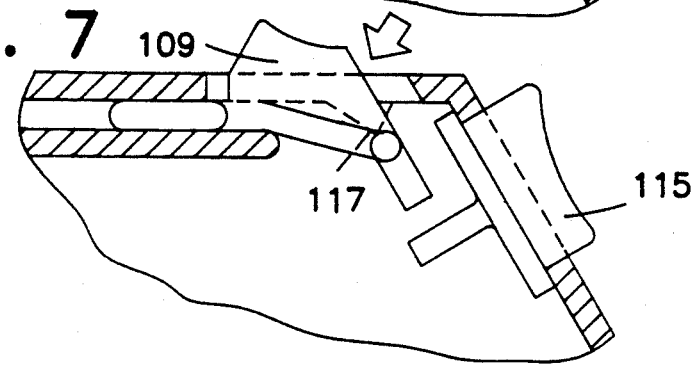

FIG. 5 of the drawings illustrates a safety construction 109 in isolation while FIG. 6 illustrates the same safety in a partial cross-section view associated with the on/off switch 115 and a lock feature 117. It is seen that the safety 109 must be pressed downwardly to pass by the locking feature 117 which is illustrated in FIG. 7. As illustrated in FIG. 7, when the safety feature is released, the on/off switch 115 is available for normal operation.

Figure 8:
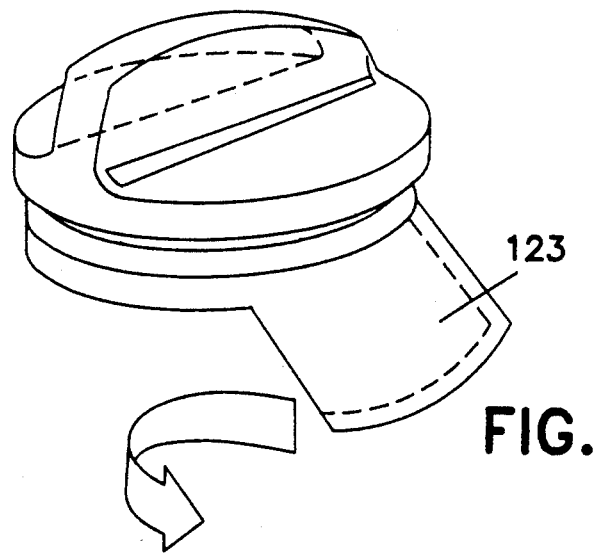
FIGS. 8, 8A and 8B of the drawings illustrate an embodiment of a safety mechanism in perspective and cross-sectional view.
Figure 8A:
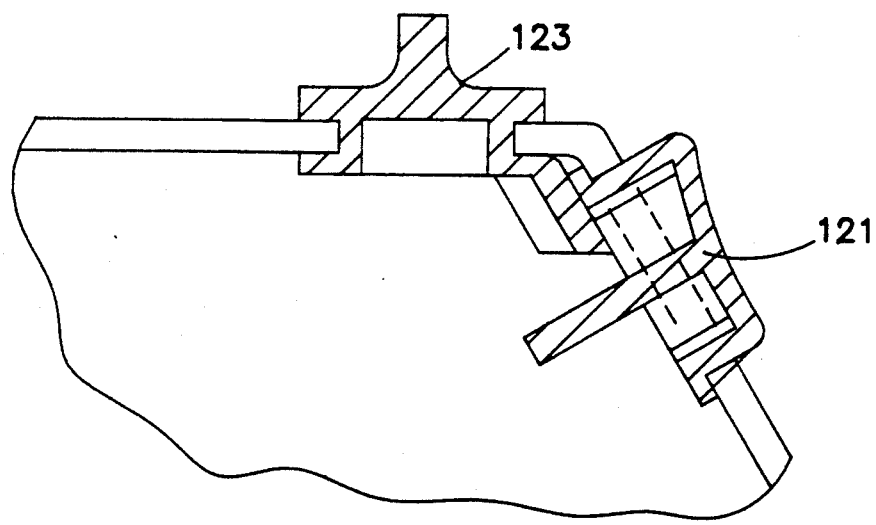
Figure 8B:
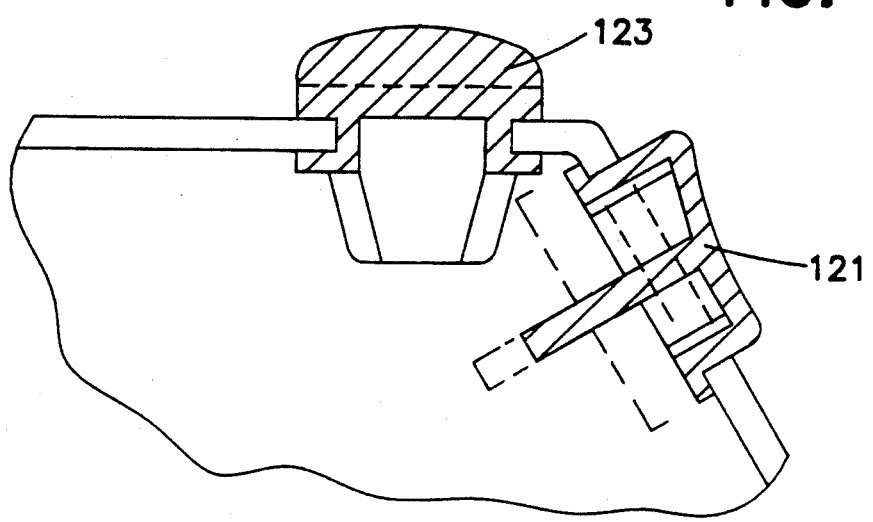

FIGS. 8, 8A and 8B illustrate an additional radial safety construction which may be utilized in association with on/off switch 121. FIG. 8 is a perspective view of the radial safety 123 which when positioned as in FIG. 8A, prevents operation of switch 121 but which when rotated as illustrated in FIG. 8B, permits switch 121 to be activated.

DESCRIPTION OF A PREFERRED EMBODIMENT

FIGS. 9, 10, 11 and 12 illustrate sequences of operation for a pump mechanism incorporated into a bottle cap. The construction to be described provides a pumping function in accordance with this invention and includes the further features of a shut-off diaphragm to prevent leakage during shipping or inadvertent squeezing or inversion. A positive vent is provided to ventilate the bottle during pumping but otherwise remaining closed to contain the contents of the bottle.

Figure 9:
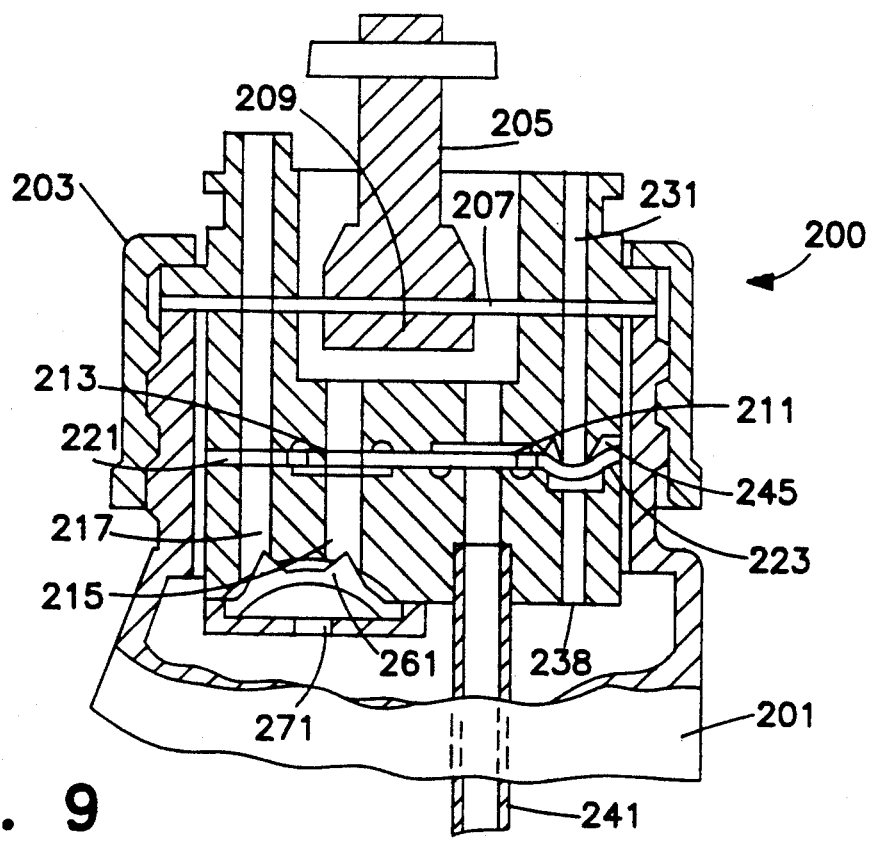
FIGS. 9, 10, 11 and 12 of the drawings illustrate in a cross-sectional view a preferred pump mechanism in accordance with this invention in sequential operation.

FIG. 9 illustrates the pump mechanism 200 which is mounted upon a container neck 201 and maintained thereon by a cap 203. The pump mechanism 200 includes a rod 205 acting in concert with a flexible diaphragm 207 through piston-like end 209. Flapper valves 211 and 213 operate similar to those previously described as does outlet 215 and conduit means 217. It should be noted, however, that in this construction flapper valves 211 and 213 are formed from a diaphragm 221 which is coplanar with vent diaphragm 223.

Figure 10:
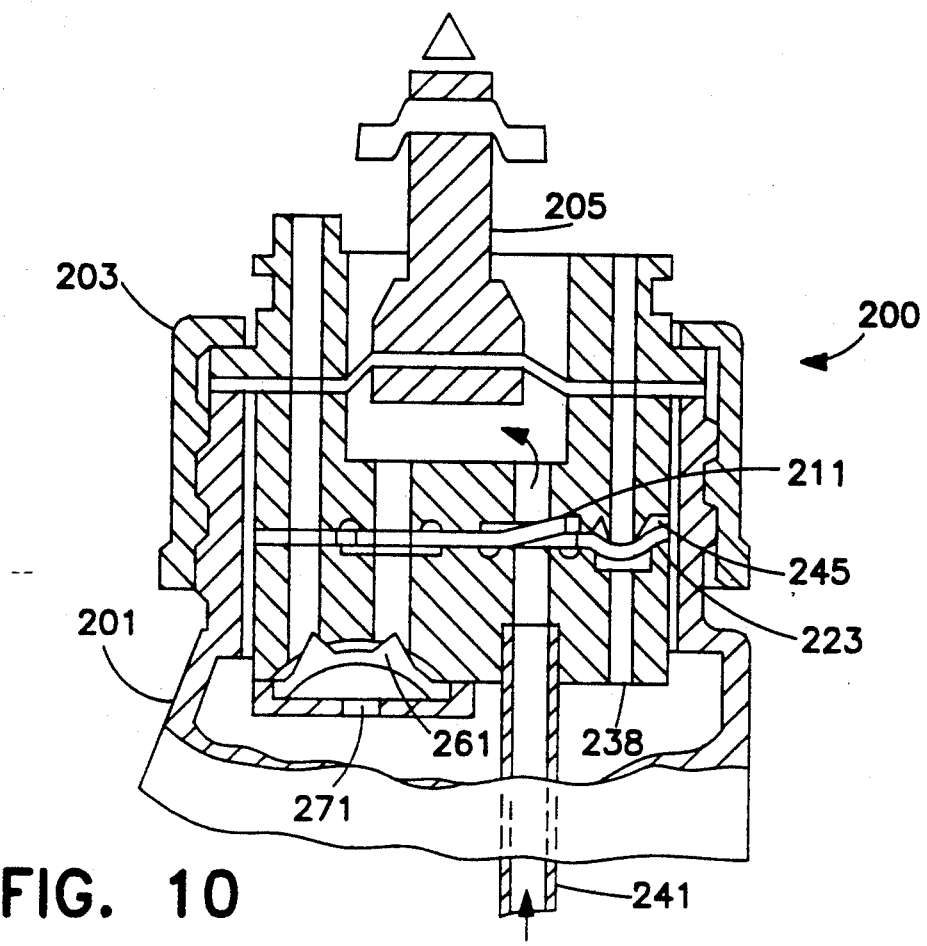
Figure 11:
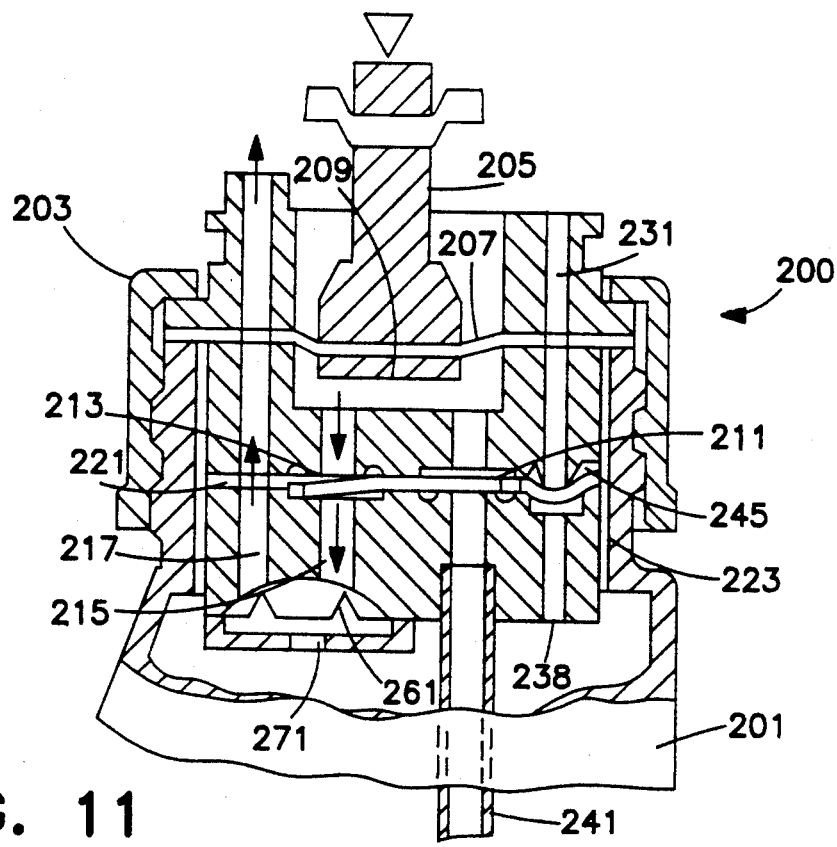
Figure 12:
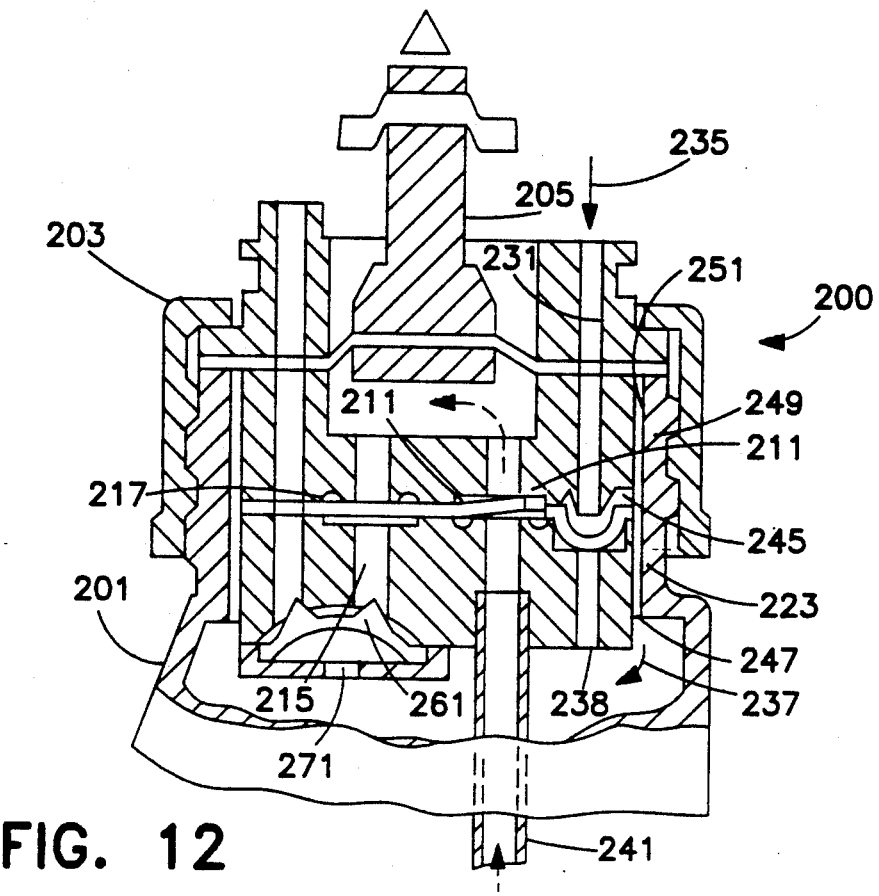

Vent diaphragm 223 as illustrated in FIGS. 9 through 12 covers and closes vent 231. Upon the pressure in neck portion 201 dropping below the surrounding pressure vent diaphragm 223 is forced into the position illustrated in FIG. 12 to permit venting into the bottle neck portion 201 in the direction indicated by arrows 235 and 237. Vent diaphragm 223 communicates through conduit 238 with the interior of container neck 201. As illustrated in FIG. 12, movement of vent diaphragm 223 occurs upon the raising of rod 205 thus opening flap valve 211 and withdrawing fluid through dip tube 241 which reduction in pressure is relieved through vent 231 as described above.

From viewing FIG. 12 it is seen that upon the retraction of vent diaphragm 223, a passageway 245 is opened which permits communication through vent 231 and a narrow passage 247 defined between edge 249 of pump mechanism 200 and the inner wall 251 of the container neck portion so as to permit air flow as indicated by arrow 237.

Referring again to FIG. 9 there is also provided a shutoff mechanism 261 which is a flexible diaphragm biased to close off outlet 215 and conduit means 217 during shipping and non use. As illustrated in FIG. 9 it is seen that shut-off diaphragm 261 completely prevents any fluid communication between the bottleneck portion 201 and the outside of the pump mechanism environment. Shut-off diaphragm 261 prevents squeezing and inversion from causing leakage from the container environment.

However, upon activation of rod 205 as illustrated in FIGS. 10 and 11 shut-off diaphragm 261 moves from the biased position illustrated in FIGS. 9 and 10 to a flattened position illustrated in FIG. 11. During continuous operation, shut-off diaphragm 261 remains in the flattened condition as illustrated in FIG. 11 but when operation is completed, returns to the biased position illustrated in FIGS. 9 and 12. Closure diaphragm 261 is able to maintain the flattened configuration since anything beneath the diaphragm 261 is released through a conduit 271 communicating with the interior of the neck portion 201.

The sequence of operation is illustrated in FIGS. 9, 10, 11 and 12. In FIG. 9 the apparatus is at rest with shutoff diaphragm 261 and vent diaphragm 223 sealing the contents within the container. In FIG. 10, rod 205 has moved upwardly to draw some fluid through flap valve 211. The withdrawal, however, at this stage has not been sufficient to unseat vent diaphragm 223. In FIG. 11 rod 205 has moved downwardly to force fluid through flapper valve 213 and causing shut-off diaphragm 261 to move into a flattened condition permitting flow through outlet 215 and into conduit means 217.

Referring to FIG. 12, rod 205 has again moved upwardly to draw fluid through flapper valve 211. At this point the pressure within the container has been reduced sufficiently to unseat vent diaphragm 223 and cause the venting as there illustrated and previously described. Shut-off diaphragm 261 is illustrated in FIG. 12 as closing outlet 215 and conduit means 217. In actual operation, however, it is believed that shut-off diaphragm 261 does not have time to relax such that the configuration illustrated in FIG. 11 is in all likelihood the configuration that exists during continuous operation of pump mechanism 200.

It should be noted that vent diaphragm 223 and shut-off diaphragm 261 operate independently of one another while simultaneously assuring proper operation of pump mechanism 200.

Rod 205 and piston-like end 209 of necessity must connect with one another through flexible diaphragm 207. Various configurations can be utilized to achieve this connection. For example, a screw connection might pass through diaphragm 207 or the entire assembly of rod 205, piston-like end 209 and flexible diaphragm 207 may be molded from a single material with the thickness of diaphragm 207 rendering it flexible while the remainder is generally of a more permanent configuration due to the geometry thereof. Of course, other methods of construction may be utilized such as adhesive bonding, insert molding or ultrasonic or heat bonding utilizing a peg to pass through flexible diaphragm 207.

Figure 13:
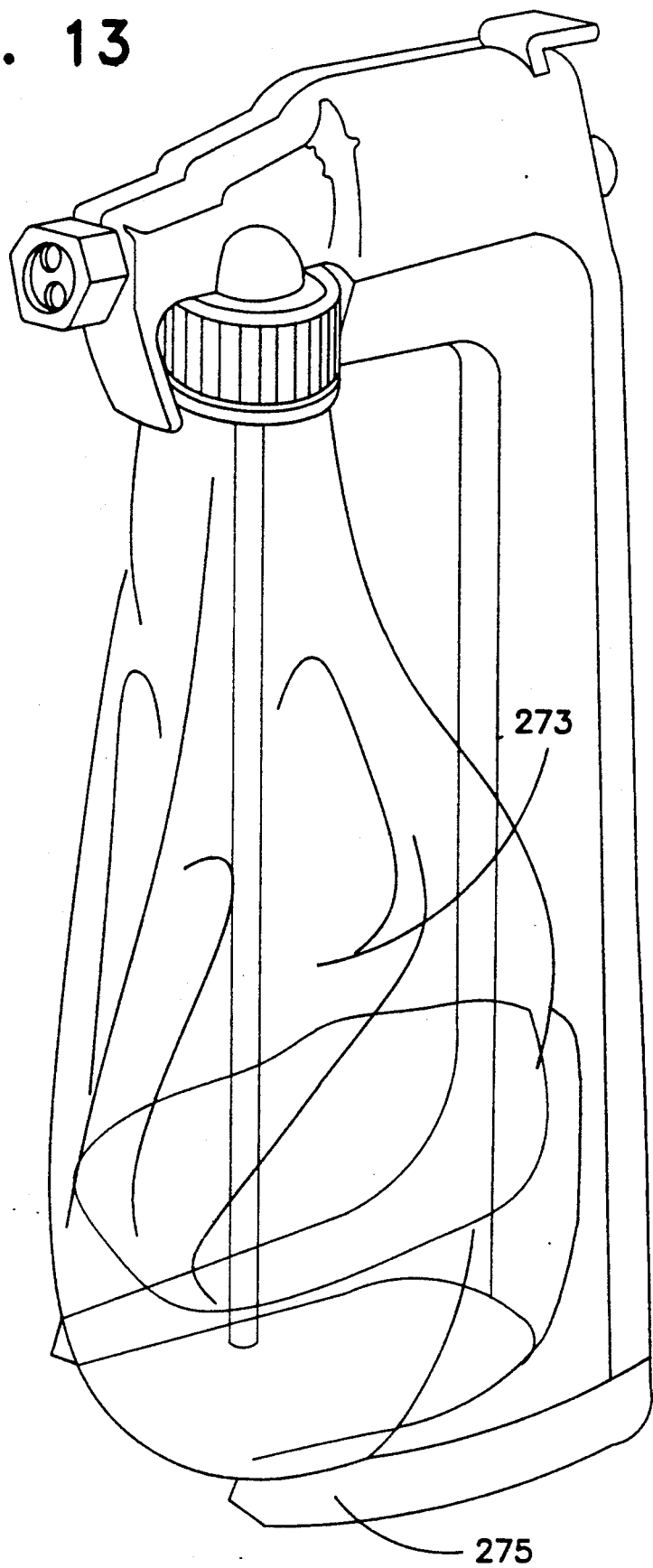
FIG. 13 of the drawings is a perspective view of the hand-held dispersion with a flexible container.

It is contemplated that a container used with the preferred embodiment pump mechanism as described above may also be a flexible bag rather than a rigid container, as illustrated in FIG. 13 of the drawing. In the event that a flexible bag 273 is utilized, there is no need to provide the vent diaphragm structure associated with 223 and the vent 231. The construction described with regard to the preferred embodiment, however, is adaptable such that vent 231 may be sealed off if utilized with a bag structure or vent membrane 223 may be simply adhered in place over vent 231. In the event that a flexible 273 is utilized, the handle structure housing batteries would simply be extended to provide for a base 275 to support the entire structure.

It is thus seen that the hand held dispenser of this invention provides a novel portable apparatus for the dispensing of liquids It is further seen that this apparatus provides swirl spray patterns and foaming at low pressures. As the above description is exemplary in nature, many variations will become apparent to those of skill in the art. Such variations, however, are embodied within the spirit and scope of this invention as defined by the following appended claims.

That which is claimed is:

1. A process of dispensing a spray or stream of a liquid cleaning product comprising the steps of:
   providing a hand held dispenser comprising;
   a container for a liquid,
   a dispensing nozzle assembly, said nozzle assembly including an outlet,
   a screw-shaped structure within said nozzle assembly to impart a swirl motion to a liquid passing therethrough,
   a cyclical pump for pumping said liquid from said container to said nozzle assembly, said pump being in communication with an electrical motor for driving said pump,
   a flexible tube in liquid flow communication between said pump and said nozzle assembly for conducting liquid therethrough and for absorbing energy from said liquid as it is pumped and subsequently releasing said energy to said liquid,
   cyclically pumping said liquid from said container to said nozzle assembly at a pressure differential of less than 45 pounds per square inch gauge, said liquid passing through said flexible tube during one part of said cycle imparting energy to said flexible tube and during another part of said cycle receiving energy from said flexible tube;
   said liquid contacting said screw-shaped structure within said nozzle assembly with sufficient energy to create a turbulent flow adjacent said screw-shaped structure to pass through said outlet with said swirl motion imparted thereto;
   said flow of liquid passing through said outlet having a moderated cyclical velocity due to the absorption and release of energy by said flexible tube.

2. A vent apparatus for a container of liquid from which the liquid is dispensed comprising:
   a closure for the container;
   a first passageway through said closure communicating with the outside environment;
   a vent diaphragm having one side across said passageway and normally closing said passageway;
   a second passageway adjacent said diaphragm communicating with the interior of said container said second passageway being adjacent and normally closed by said one side of said vent diaphragm;
   a third passageway communicating with the other side of said diaphragm and the interior of said container;
   said vent diaphragm being flexible whereby when the pressure on the inside of the container is below that of the outside of the container said vent diaphragm is dislodged whereby said first passageway and said second passageway communicate with one another to permit gas flow from the exterior of the container to the interior of the container.

3. A closure for a container for dispensing liquid to prevent dispensing of liquid during periods of non-operation comprising:
   a dispensing orifice;
   means defining an outlet from which fluid is forced for purposes of dispensing;
   means defining conduit means in communication with said dispensing orifice; and
   a shut-off diaphragm between said means defining an outlet and said means defining conduit means normally biased to close said means defining an outlet and said conduit means on one side thereof and having the other side thereof in gaseous communication with the interior of the container.

* * * * *